(12) United States Patent
Dayan et al.

(10) Patent No.: US 11,240,195 B2
(45) Date of Patent: *Feb. 1, 2022

(54) SYSTEMS AND METHODS FOR DIRECT DISPATCHING OF MOBILE MESSAGES

(71) Applicant: Google LLC, Mountain View, CA (US)

(72) Inventors: Tal Dayan, Los Gatos, CA (US); Doru Costin Manolache, Mountain View, CA (US); Subir Uhanb, Cupertino, CA (US); Francesco Nerieri, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,538

(22) Filed: Jul. 30, 2019

(65) Prior Publication Data
US 2020/0059449 A1   Feb. 20, 2020

Related U.S. Application Data

(63) Continuation of application No. 14/977,626, filed on Dec. 21, 2015, now Pat. No. 10,412,040.

(60) Provisional application No. 62/113,254, filed on Feb. 6, 2015.

(51) Int. Cl.
*H04L 12/24* (2006.01)
*H04L 12/58* (2006.01)
*H04L 29/08* (2006.01)

(52) U.S. Cl.
CPC ............. *H04L 51/38* (2013.01); *H04L 67/10* (2013.01); *H04L 67/142* (2013.01); *H04L 67/2842* (2013.01); *H04L 67/145* (2013.01)

(58) Field of Classification Search
CPC ....... H04L 51/38; H04L 67/142; H04L 67/10; H04L 67/2842; H04L 67/145
USPC ......................................................... 709/206
See application file for complete search history.

(56) References Cited

U.S. PATENT DOCUMENTS

| | | | |
|---|---|---|---|
| 6,574,229 B1 * | 6/2003 | Takahashi | H04L 29/06 370/400 |
| 8,364,830 B2 * | 1/2013 | Kimizuka | H04L 67/2814 709/229 |
| 8,683,023 B1 | 3/2014 | Brandwine | |

(Continued)

OTHER PUBLICATIONS

PCT/US2016/015918 International Search Report and Written Opinion dated May 6, 2016.

*Primary Examiner* — Ario Etienne
*Assistant Examiner* — Elizabeth Kassa
(74) *Attorney, Agent, or Firm* — Lerner, David, Littenberg, Krumholz & Mentlik, LLP

(57) ABSTRACT

In an example implementation of the disclosed technology, a method includes predicting, by a computing device, a destination server that is predicted to be the destination of a message from a sending device connected to the computing device. The method also includes determining whether a connection exists between the computing device and the destination server. The method also includes, responsive to determining that no connection exists, determining a connection and caching the connection at the computing device. The method also includes, responsive to receiving a message for dispatch to the destination server, dispatching the message to the destination server via the connection.

20 Claims, 5 Drawing Sheets

(56) References Cited

U.S. PATENT DOCUMENTS

| | | | |
|---|---|---|---|
| 8,812,579 B2* | 8/2014 | Rivera | H04L 67/1002 709/202 |
| 8,868,779 B2 | 10/2014 | O'Neill | |
| 8,930,552 B2* | 1/2015 | Ueno | H04L 69/161 709/228 |
| 9,130,942 B2* | 9/2015 | Suryavanshi | H04W 4/20 |
| 9,172,821 B2 | 10/2015 | Smith | |
| 9,258,335 B1* | 2/2016 | Taylor | H04L 67/2828 |
| 9,374,294 B1 | 6/2016 | Pani | |
| 10,069,714 B2* | 9/2018 | Matsunaga | H04L 45/00 |
| 10,122,608 B1* | 11/2018 | Riggs | H04L 43/106 |
| 10,182,126 B2* | 1/2019 | Johnsimon | H04L 67/2814 |
| 2003/0154244 A1* | 8/2003 | Zellers | H04L 63/029 709/203 |
| 2004/0255307 A1* | 12/2004 | Irudayaraj | H04L 67/1095 719/328 |
| 2006/0259607 A1* | 11/2006 | O'Neal | H04L 67/104 709/223 |
| 2007/0174402 A1* | 7/2007 | Tomkow | H04L 51/00 709/206 |
| 2007/0223453 A1* | 9/2007 | Takase | H04L 67/1012 370/352 |
| 2007/0283013 A1* | 12/2007 | Park | H04L 63/02 709/225 |
| 2008/0086556 A1* | 4/2008 | Ramalingam | H04L 29/12066 709/224 |
| 2008/0171564 A1 | 7/2008 | Tanizawa | |
| 2010/0085947 A1 | 4/2010 | Ringland | |
| 2010/0205292 A1 | 8/2010 | Diaz | |
| 2010/0274922 A1 | 10/2010 | Reavely | |
| 2011/0153722 A1 | 6/2011 | Choudhary | |
| 2011/0282571 A1 | 11/2011 | Krumm | |
| 2011/0286597 A1 | 11/2011 | Haddad | |
| 2012/0023226 A1* | 1/2012 | Petersen | H04L 65/608 709/224 |
| 2012/0036254 A1* | 2/2012 | Onuma | H04L 67/1008 709/224 |
| 2012/0054271 A1 | 3/2012 | Leroy | |
| 2012/0066399 A1* | 3/2012 | Marquardt | H04L 69/162 709/228 |
| 2014/0237067 A1* | 8/2014 | Todd | H04L 67/1031 709/213 |
| 2014/0337536 A1* | 11/2014 | Tang | H04W 76/38 709/227 |
| 2015/0215406 A1* | 7/2015 | Eggert | H04L 67/28 709/228 |
| 2017/0026324 A1* | 1/2017 | Adkins | H04L 51/26 |

* cited by examiner

SYSTEMS AND METHODS FOR DIRECT DISPATCHING OF MOBILE MESSAGES

CROSS-REFERENCE TO RELATED APPLICATIONS

The present application is a continuation of, and claims priority to, U.S. patent application Ser. No. 14/977,626, titled "SYSTEMS AND METHODS FOR DIRECT DISPATCHING OF MOBILE MESSAGES" and filed on Dec. 21, 2015, which claims priority to and the benefit of U.S. Provisional Patent Application Ser. No. 62/113,254, which was filed on Feb. 6, 2015. The entire contents and substance of the aforementioned applications are hereby incorporated by reference in their entirety as if fully set forth herein.

BACKGROUND

Mobile messages are critical and are used by, among others, email, calendar, chat, and social network applications. Conventional messaging systems dispatch mobile messages in real time from thousands of source messaging servers to thousands of destination messaging servers, each of which is connected to hundreds of thousands of mobile devices. These messaging systems result in large numbers of source/destination server pairs, each of which represents a dispatching route, that continuously change and have to be updated as servers go on and off line. Maintaining this large number of connections is inefficient and unnecessarily ties up resources as not all source/destination server pairs are necessary at all times. In an effort to avoid the large number of source/destination server pairs, messaging systems may incorporate intermediary servers to manage message dispatching. Using intermediary servers reduces the overall number of source/destination server pairs (i.e., connections), but it makes the dispatching routes longer because it leads to additional hops from server to server as opposed to a direct route from source server to destination server, thus increasing latency and complexity. Accordingly, what is needed is a direct message dispatching system that reduces the number of unnecessary source/destination server pairs.

SUMMARY

Some or all of the above needs may be addressed by certain implementations of the disclosed technology. According to an example implementation, a method is provided. The method may include predicting, at a computing device, a destination server to which the computing device can dispatch mobile messages, and determining, by the computing device, whether a connection between the computing device and the destination server is cached at the computing device. Further, the method may include, responsive to determining no connection between the computing device and the destination server is cached at the computing device, determining a connection between the computing device and the destination server, and caching, at a connection cache of the computing device, the connection between the computing device and the destination server. Finally, the method may include, responsive to receiving, at the computing device, a message for dispatch to the destination server, dispatching the message via the cached connection.

According to an example implementation, a system is provided. The system may include one or more processors and a memory coupled to the one or more processors and storing instructions that, when executed by the one or more processors, cause the system to: predict a destination to which the system can dispatch mobile messages; determine whether a connection between the system and the destination server is cached at the system; responsive to determining no connection between the system and the destination server is cached at the system, determine a connection between the system and the destination server; cache, at a connection cache of the system, the connection between the system and the destination server; and responsive to receiving, at the system, a message for dispatch to the destination server, dispatch the message via the cached connection.

According to an example implementation, a computer-readable medium is provided. The computer-readable medium may store instructions that, when executed by one or more processors, cause a first computing device to: predict a destination server to which the computing device can dispatch mobile messages; determine whether a connection between the computing device and the destination server is cached at the computing device; responsive to determining no connection between the computing device and the destination server is cached at the computing device, determine a connection between the computing device and the destination server; cache, at a connection cache of the computing device, the connection between the computing device and the destination server; and responsive to receiving, at the computing device, a message for dispatch to the destination server, dispatch the message via the cached connection.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
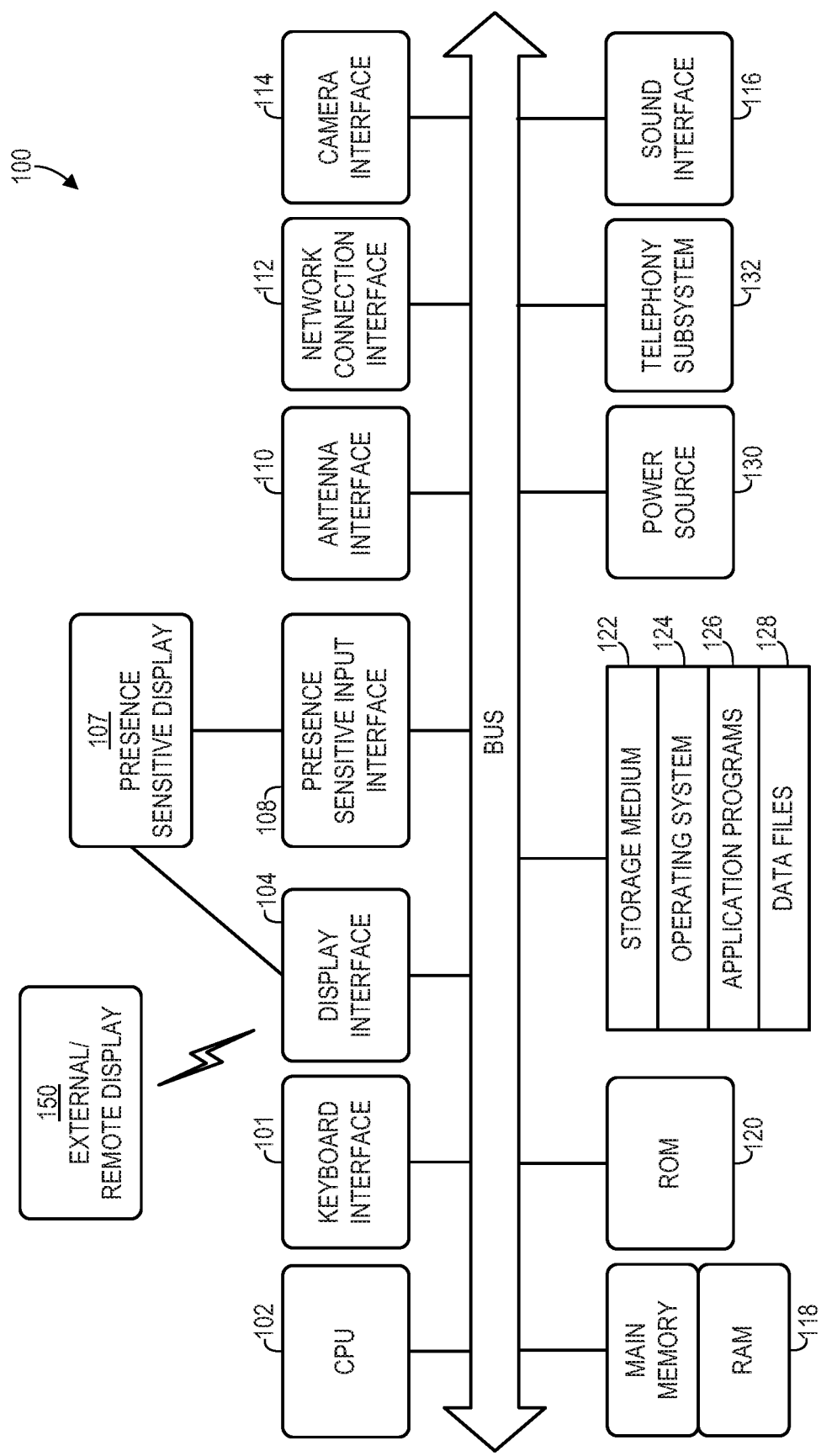
FIG. 1 is a block diagram of an illustrative computer system architecture 100, according to an example implementation.

Mobile device users often send mobile messages to other mobile device users. Put differently, senders send messages to recipients. In an example implementation, a sender's message is transmitted from the sender's device to a source server. The source server may then determine the destination server to which the receiver's mobile device is connected and dispatch the message to the destination server so it can be delivered to the recipient. In some implementations of the disclosed technology, a predictor of a source server predicts which destination servers are likely destinations for messages received at the source server and provides this information to a warmer. The warmer then checks a connection cache to determine whether a connection between the source server and predicted destination server(s) has been cached. If no connection has been cached, the warmer can initiate a connection creation process. This connection creation process can include not only creating a connection between the source server and a predicted destination server, but sending a dummy message from the source server to the predicted destination server to ensure a functioning connection.

In some implementations of the disclosed technology, in addition to predicting the destination servers that are likely destinations for messages received from senders' mobile devices, the predictor may also monitor the address of those destination servers. Destination servers typically have a logical name or logical ID by which they are identified. But this is merely an identifier and, while the predictor is interested in identifying specific destination servers, it must also monitor the address to which the destination server is assigned. So, while the predictor may predict that a particular destination server is a likely destination for messages received at the source server (e.g., the destination server having logical name "xy.my_server.65"), this prediction is meaningless unless the predictor also knows the address assigned to xy.my_server.65. Because the address assigned to a destination server changes over time (e.g., when a server loses power, when a server goes off line for maintenance), a predictor can monitor changes in the address assignment of predicted destination servers and notify the warmer of any changes.

In some implementations of the disclosed technology, as discussed, based on information received at the warmer, the warmer can initiate a connection creation process if the warmer determines no connection between the source server and predicted destination server exists in the cache. But, further based on information received at the warmer, the warmer can initiate a connection deletion process to remove redundant or no-longer-pertinent connections from the cache.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example implementations of the disclosed technology will now be described with reference to the accompanying figures.

As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a central processing unit (CPU) 102, where computer instructions are processed; a display interface 104 that acts as a communication interface and provides functions for rendering video, graphics, images, and texts on the display. In certain example implementations of the disclosed technology, the display interface 104 may be directly connected to a local display, such as a touch-screen display associated with a mobile computing device. In another example implementation, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 104 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 104 may be operatively coupled to a local display, such as a touch-screen display associated with a mobile device. In another example, the display interface 104 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 104 may wirelessly communicate, for example, via the network connection interface 112 such as a Wi-Fi transceiver to the external/remote display.

The computing device architecture 100 may include a keyboard interface 106 that provides a communication interface to a keyboard. In one example implementation, the computing device architecture 100 may include a presence-sensitive display interface 108 for connecting to a presence-sensitive display 107. According to certain example implementations of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. As mentioned above, the display interface 104 may be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components.

According to an example implementation, the computing device architecture 100 includes a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 128 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
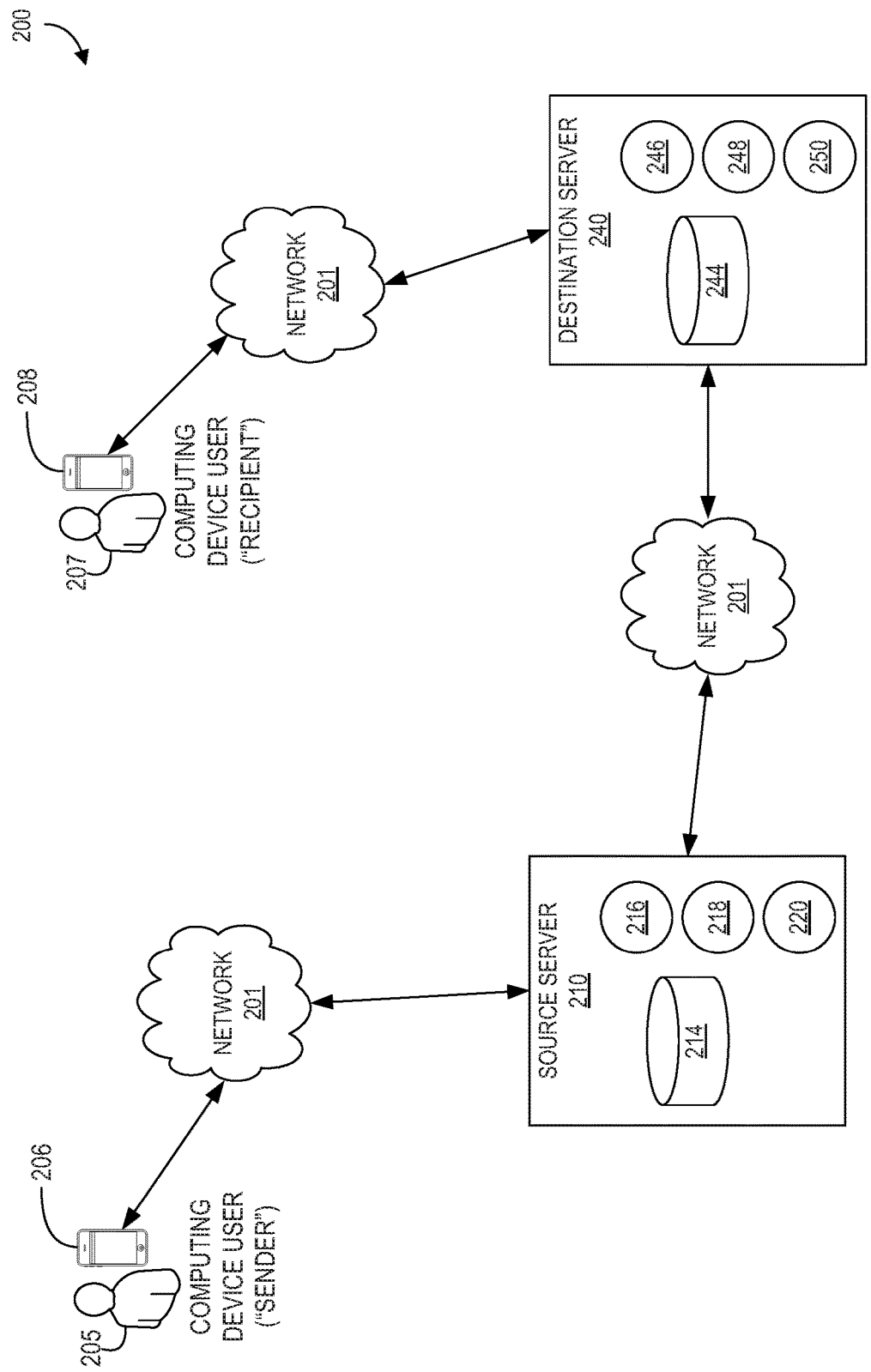
FIG. 2 is an overview of an environment 200 illustrating components that may be included in a direct dispatching system for mobile messages, according to an example implementation.

FIG. 2 illustrates an overview of an implementation of components that may be included in and/or utilize a direct dispatching system for mobile messages in an exemplary environment 200. According to one implementation, a source server 210 and a connection server 240 can be operatively connected through a network 201, such as the Internet. Though not shown, it will be understood by one of skill in the art that many source servers and destination servers can be operatively connected through a network 210. Further, though shown independently, a source server 210 and destination server 240 can be co-located. Further, as will be understood by one of skill in the art, a source server 210 can also provide the same functionalities as a destination server 240, and a destination server 240 can provide the same functionalities as a source server 210.

Further, mobile users 205 and 207 may use computing devices 206 and 208 (e.g., a mobile phone, laptop computer, tablet computer, or other computing device), respectively, which may be operatively connected to one or more source servers 210 and one or more destination servers 240 through a network 201. In example scenarios, a first mobile user 205 may wish to send a mobile message to a second mobile device user 207, via their respective mobile devices 206, 208. In such a scenario (and throughout this application), the first mobile device user 205 may be conveniently referred to as the "sender," and the second mobile device user 207 may be conveniently referred to as the "recipient." As will be understood by one of skill in the art, source servers 210, destination servers 240, and computing devices 206 and 208 may include some or all of the components of the computing device 100 shown in FIG. 1.

In some implementations, a source server 210 can be configured to receive mobile messages (e.g., email messages, text messages, Google Hangout messages, "tweets," Facebook messages, and various other mobile messages as will be familiar to one of skill in the art) sent from a sender's computing device (e.g., 206) and intended for a recipient's computing device (e.g., 208). Further, in some implementations, a destination server 240 can be configured to establish connections with mobile devices (e.g., 206, 208) and deliver messages intended for those mobile devices.

According to some implementations, a source server 210 or a destination server 240 can comprise a database and a plurality of server instances. For example, as shown in FIG. 2, a source server 210 can comprise a database 214 and source server instances 216, 218, and 220. As shown in FIG. 2, a destination server 240 can be similarly configured as it can comprise a database 244 and destination server instances 246, 248, and 250. As will be understood by one skill in the art, a source server 210 or destination server 240 can comprise thousands of source server instances (e.g., 216) and destination server instances (e.g., 246), respectively.

Likewise, as will be understood, an environment 200 for utilizing a direct dispatching system for mobile messages can comprise more or less components than shown in FIG. 2. In various implementations, the source servers (e.g., 210) and destination servers (e.g., 240) may be distributed across the globe. As will be understood and appreciated, such a distributed configuration of source servers and destination servers may allow billions of computing devices (e.g., 206, 208) to send and receive messages.

Figure 3:
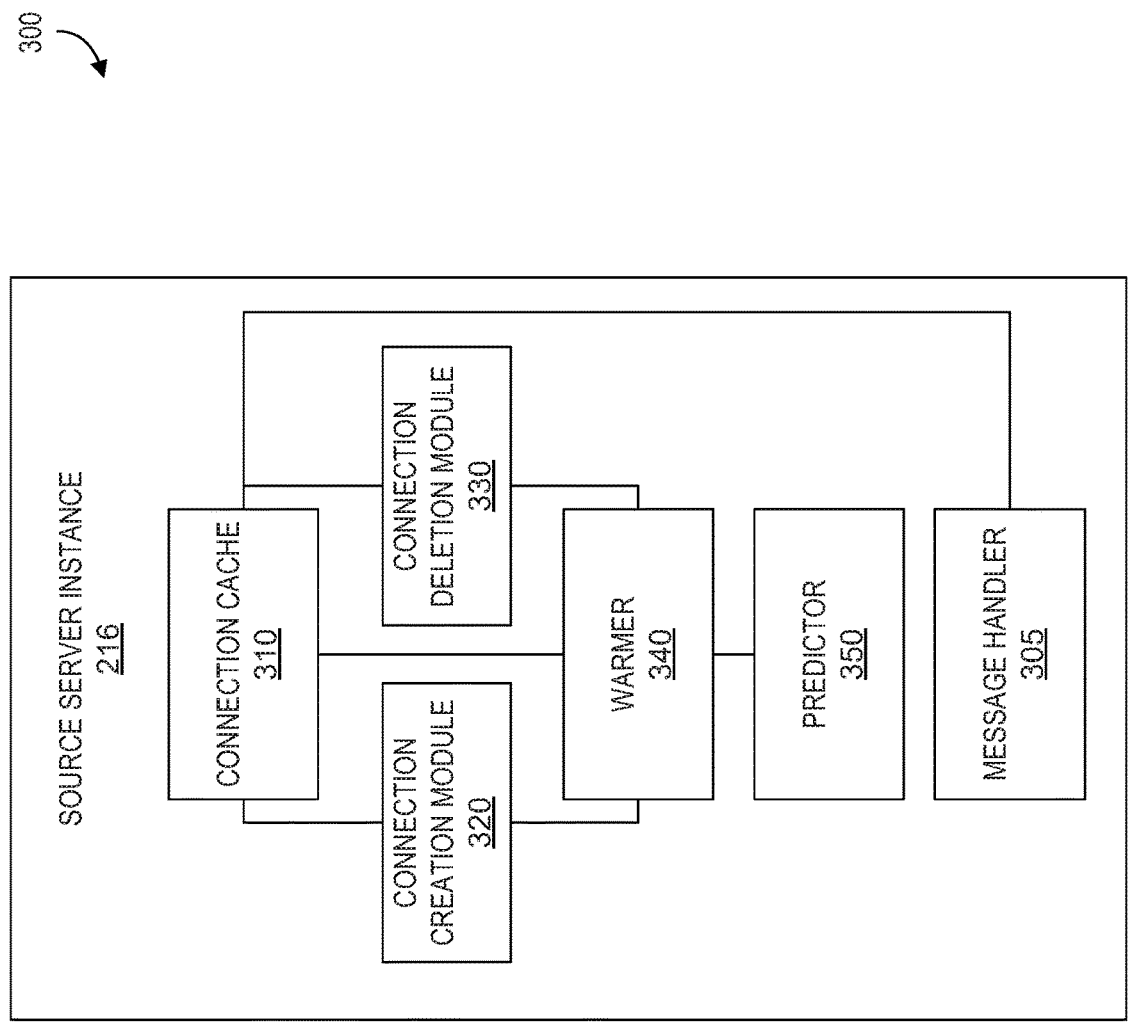
FIG. 3 is an illustrative source server instance, according to an example implementation.

FIG. 3 illustrates an exemplary system architecture 300 of a source server instance 216, according to an example implementation. As will be understood, in some implementations, a source server instance 216 can be hosted on a source server 210. As shown in FIG. 3, in some implementations, a source server instance 216 can comprise various collections of software modules that can comprise databases and software relating to processes, sub-routines, or various algorithms operated by an implementation of a source server instance 216 and relating to direct dispatching of messages. In some implementations, the software modules can include a message handler 305, a connection cache 310, a connection creation module 320, a connection deletion module 330, a warmer 340, and a predictor 350. It will be understood by one of skill in the art that while the various software modules are shown separately, this is merely for illustrative purpose and not for limitation.

As described above, in example scenarios, a sender 205 wishes to send a message to a recipient 207. Though it is understood by one of skill in the art that the computing device 206 of the sender 205 sends the message to the computing device 208 of the recipient, in the application, for convenience, reference may be made to the sender 205 sending a message to the recipient 207. Similarly, while it is understood that computing devices (e.g., 206, 208) are connected to servers (e.g., 210, 240), reference may be made to a sender 205 or recipient 207 being connected to a server (e.g., 210, 240).

To assist in the process of sending messages from a sender 205 to a recipient 207, in some implementations of the disclosed technology, a predictor 350 of a source server instance 216 can predict the destination servers (e.g., 240) that are likely destinations for messages received from senders (e.g., 205). The predictor 350 can provide these predictions to a warmer 340, and the warmer 340 can check a connection cache 310 to determine whether there is an existing connection between the source server 216 and the predicted destination servers (e.g., 240). If no connection exists, in some implementations, a warmer can initiation a connection creation process, which can be performed by a connection creation module 320. Similarly, in some implementations, to make room for a new connection, the warmer 340 can initiate a connection deletion process to remove outdated or no-longer-necessary connections from the connection cache 310. In some implementations, the connection deletion process can be performed by a connection deletion module 330.

As will be appreciated, use of a predictor 350 can improve mobile message dispatching. For example, by predicting which destination servers (e.g., 240) are likely destinations for incoming messages and establishing connections to the predicted destination servers, source servers 210 (or source server instances 216) can maintain fewer connections with destination servers 240 (or destination server instances 246). This can free up resources that would ordinarily be tied up because of the unnecessary connections. Further, use of a predictor 350 to establish connections to predicted destination servers (e.g., 240) can eliminate the need for intermediate servers that allow for continuous connections between a source server 210 (or source server instance 216) and more destination servers 240 (or destination server instances 246) than are necessary. Again, as discussed above, use of intermediate servers can be disadvantageous as it can increase latency as well as the complexity of the dispatching system.

Figure 4:
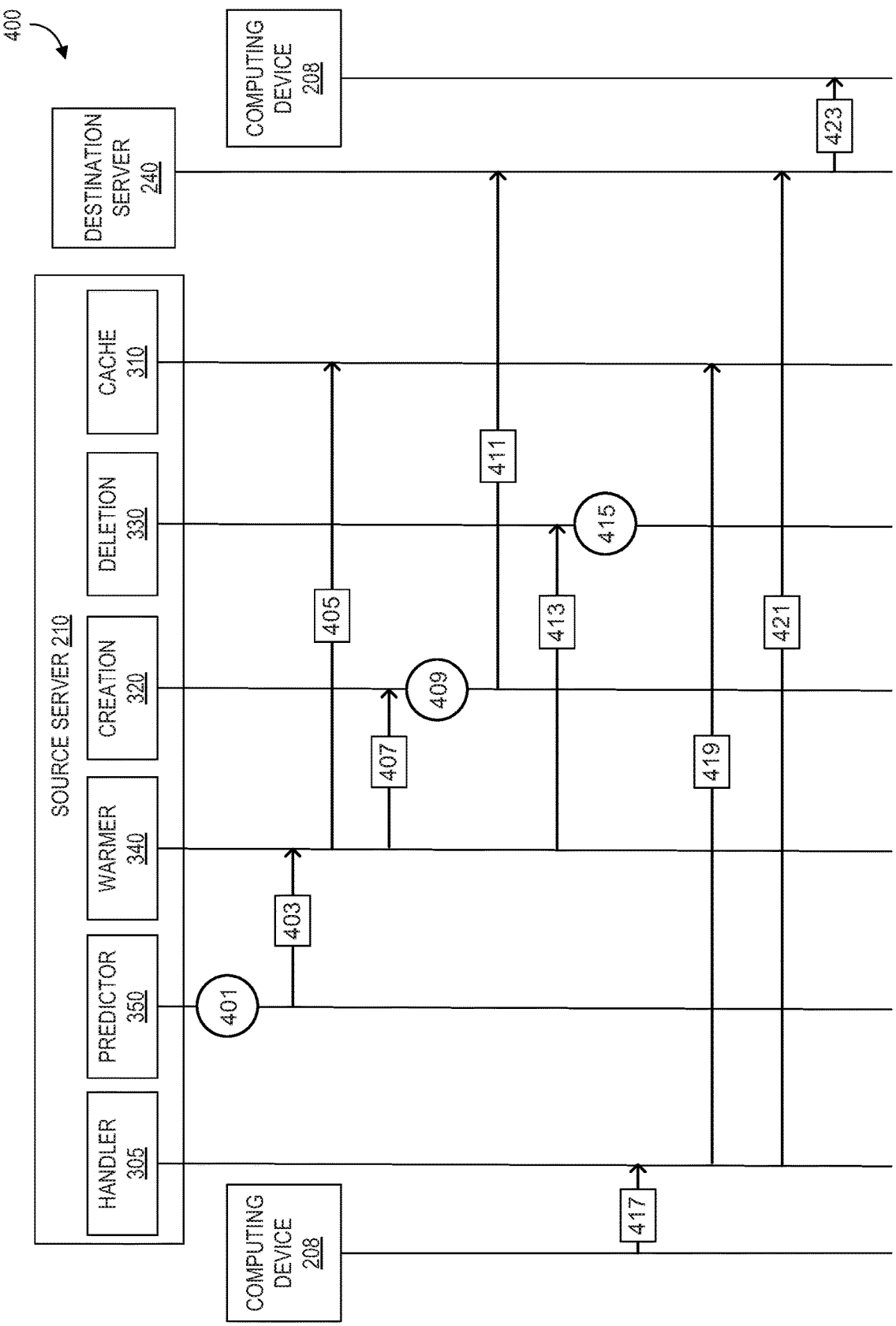
FIG. 4 is a sequence diagram illustrating an exemplary direct message dispatching process 400, according to an example implementation.

FIG. 4 is a sequence diagram illustrating an exemplary direct mobile message dispatching process 400, according to an example implementation. As discussed, in certain implementations, a predictor 350 may perform a prediction process 401 to predict destination servers (e.g., 240) that are likely destinations for messages received at the source server 210. For example, in some implementations, a predictor 350 may use historical data (e.g., information evidencing which servers have been destinations in the past) to predict which destination servers are likely destinations. Also, in some implementations, a predictor 350 can use geographical or network proximity information to determine the destination servers that are likely destinations.

In some implementations, a prediction process 401 may further comprise a monitoring process, though the monitoring process may be an entirely separate process. As will be understood, in certain implementations, a destination server 240 can be assigned a logical ID (or logical address) by which the destination server 240 can be identified. For example, destination server 240 may be assigned logical ID xy.my_server.65. Systems exist for assigning addresses and ports to these logical IDs. Addressing methods are known in the art, and various conventions can be used (e.g., IP address, URL, or other addressing convention). Further, addresses are used to establish connections between source servers (e.g., 210) and destination servers (e.g., 240). So, as noted, destination server 240 may be assigned logical ID xy.my_server.65. But, if a destination server 240 goes off line (e.g., for scheduled maintenance, because of a power outage, because of a crash, to implement a new version of software), the destination server 240 typically is assigned a new address when it comes back on line. So, while a destination server 240 may be assigned the address/port "xya90:23090" before going off line, when the destination server 240 comes back on line, it may be assigned a new address/port (e.g., "xya90:23054"). Accordingly, in some implementations, as part of a prediction process 401 (or as an independent process), a predictor 350 can monitor a collection of logical IDs and whenever it detects a change in an address assignment, the predictor 350 can update its prediction to reflect the new address. In some implementations, the predictor 350 continuously matches logical IDs of predicted destination servers (e.g., 240) to addresses to ensure that the predictor 350 has the most up-to-date information. Further, in some implementations, instead of predicting the destination servers (e.g., 240) that are likely destinations for messages, a predictor 350 can utilize a predetermined list of destination servers (e.g., 240) can be provided to a predictor 350, and the predictor 350 can monitor the address assignments for the destination servers on the predetermined list.

In some implementations, after making a prediction, the predictor 350 sends the prediction to a warmer 340, at 403. As discussed, in certain implementations, a predictor 350 may predict destination servers (e.g., 240) that are likely destinations for messages received at the source server 210. In some implementations, upon receipt of a prediction, the warmer 340 may access a connection cache 310 to determine whether a connection exists between the source server 210 and the predicted destination server (e.g., 240), at 405.

In some implementations, a connection cache 310 contains connections between the source server 210 and the predicted destination servers to which the source server 210 is connected (e.g., 240). For example, in some implementations, a connection can be TCP/IP-based. But, as described above, the address associated with a predicted destination server 240 can change. Accordingly, in some implementations, the cached connection represents the connection to the predicted destination server 240 at the current address of the predicted destination server 240. For convenience, it can be convenient to consider a connection as the road by which information or messages can be sent from the source server 210 and the destination server 240. But, the road (i.e., the connection) has little value without the address as the address can identify where the road ends.

So, in some implementations, at 405, when the warmer 340 accesses a connection cache 310 to determine whether a connection is cached between the source server 210 and the predicted destination server 240, the warmer 340 checks to determine whether a connection is cached between the source server 210 and the predicted destination server 240 at the current address of the destination server 240, as determined by the predictor 350. In some implementations, upon determining that no connection is cached between the source server 210 and the predicted destination server 240 (or that no connection exists to the current address of the predicted destination server 240), the warmer 340 can initiate a connection creation process. In some implementations, at 407, a warmer 340 may enlist a connection creation module 320 to perform a connection creation process, 409.

In some implementations, a connection creation process 409 may comprise determining the connection between the source server 210 and the predicted destination server 240. Further, in some implementations, a connection creation process 409 may comprise establishing a connection between the source server 210 and the predicted destination server 240 as well as ensuring that a connection between the source server 210 and a predicted destination server 240 is cached. In some embodiments, a connection creation process may further comprise dispatching a dummy message (or test message) to the predicted destination server 240 via the cached connection, at 411. As will be appreciated, transmitting a dummy message via the cached connection can ensure the cached connection is a reliable connection prior to dispatching a message via the connection.

In addition to a connection creation process 409, in some implementations, the warmer 340 can initiate a connection deletion process. For example, in some implementations, at 413, a warmer 340 may enlist a connection deletion module 330 to perform a connection deletion process, 415. So, in some implementations, upon determining a connection to a predicted destination server 240 has not been cached, in addition to initiating a connection creation process, a warmer 340 may likewise a connection deletion process to delete a cached connection that is no longer needed. For example, a cached connection may be a connection to a destination server that is no longer predicted to be a destination for messages. Accordingly, to make room for more pertinent connections, a connection deletion process can clear out old connections. In some implementations, a connection deletion process may be automatic. For example, a connection deletion process may be initiated at a particular time each day and may be configured to delete a predetermined number of cached connections. Similarly, a connection deletion process may be initiated when a certain cache size limit is met.

In some implementations, at 417, a message handler 305 of a source server 210 may receive a message from a computing device 206 of a sender 205 for dispatch to the destination server 240 connected to the computing device 208 of a recipient 207. At 419, in some implementations, the message handler 305 may check the connection cache 310 to determine whether a connection from the source server 210 to the destination server 240 has been cached. In some implementations, upon confirmation that the connection has been cached, at 421, the message handler 305 can dispatch the message directly to the destination server 240 such that the destination server 240 can deliver the message to the recipient, at 423.

In some implementations, the message handler 305 may determine that there is no cached connection between the source server 210 and the destination server connected to the intended recipient of the message received at 417. In other words, in some instances, the message handler 305 may receive a message for a recipient who is connected to a destination server that the predictor 350 has not yet predicted that a connection should be established for. In such instances, the message handler 305 can initiate a message creation process by, for example, enlisting the message creation module 320, according to some implementations.

Figure 5:
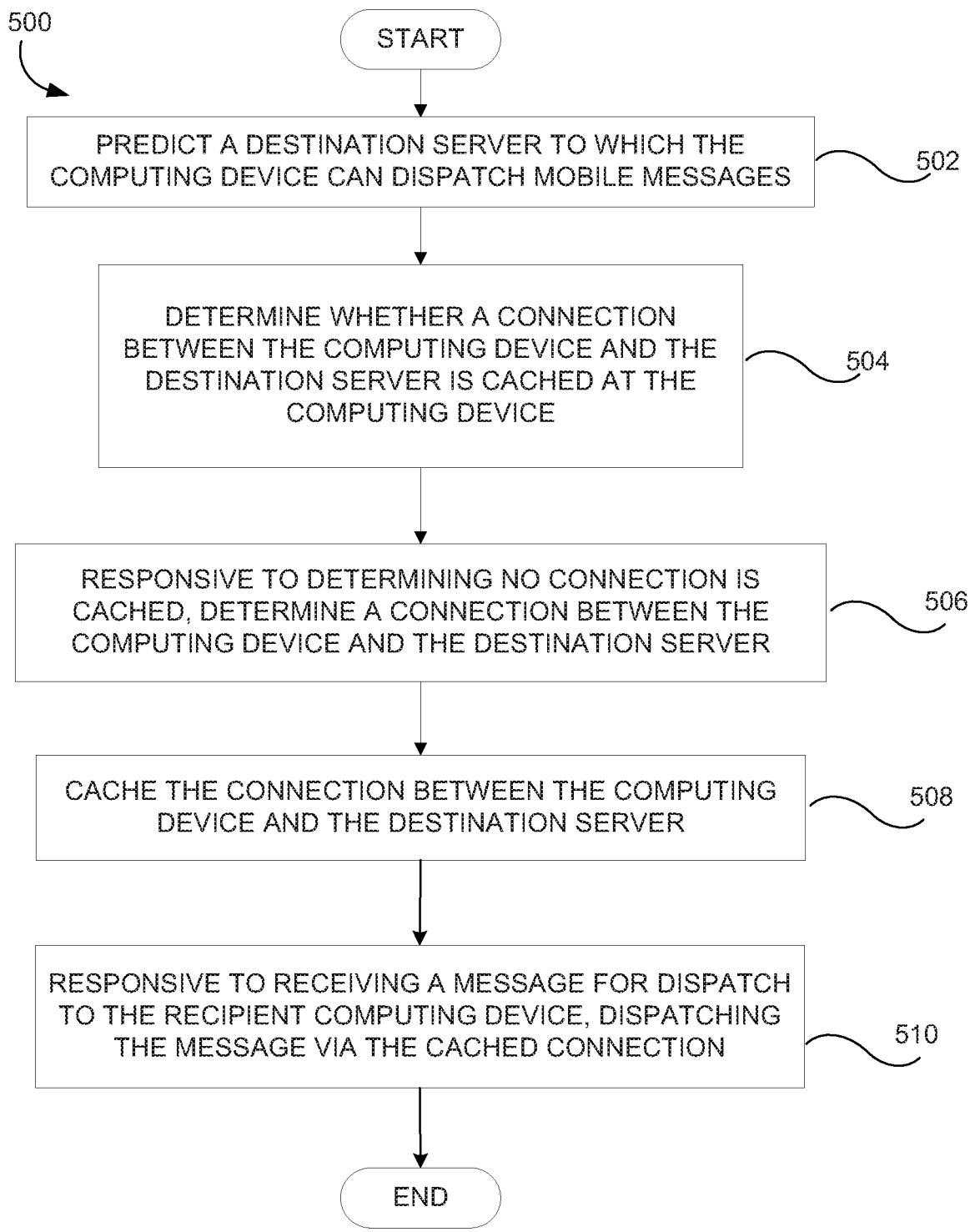
FIG. 5 is a flow diagram of a method 500 according to an example implementation.

FIG. 5 is a flow diagram of a method 500 according to an example implementation of the disclosed technology. The method 500 begins at block 502, where a computing device predicts a destination server to which the computing device can dispatch mobile messages that may be received at the computing device. According to one implementation, at 504, the computing device determines whether a connection between the predicted destination server exists and is cached. At 506, responsive to determining no connection exists and is cached, the computing device determines a connection with the destination server and then caches the connection, at 508. Finally, at 510, upon receipt of a message for dispatch to the recipient device connected to the destination server, the computing device dispatches the message via the cached connection.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
    updating respective identifiers associated with one or more destination servers based on a change in an address assignment associated with respective ones of the one or more destination servers;
    determining, using one or more processors, at least one likely destination server of the one or more destination servers to which the one or more processors can route content based on the updated respective identifiers and a pre-determined recipient for the content, the pre-determined recipient being different than the destination server;

determining, using the one or more processors, whether a preexisting connection between a computing device and the at least one likely destination server exists;
determining, using the one or more processors based on no preexisting connection, a first connection between the computing device and the at least one likely destination server; and
storing, using the one or more processors, the connection between the computing device and the at least one likely destination server.

2. The method of claim 1, further comprising:
receiving, using the one or more processors, content for routing to the at least one likely destination server; and
sending, using the one or more processors, the received content to the at least one likely destination server.

3. The method of claim 1, wherein the computing device is a source server.

4. The method of claim 1, wherein the at least one likely destination server is based on at least one of: (i) historical data, (ii) geographical proximity information, or (iii) network proximity information.

5. The method of claim 1, further comprising deleting, using the one or more processors based on the connection between the computing device and at least one likely destination server, a previous connection between the computing device and at least one unlikely destination server.

6. The method of claim 1, wherein determining the connection between the computing device and the at least one likely destination server further comprises establishing the connection between the computing device and the at least one likely destination server.

7. The method of claim 1, wherein determining the connection between the computing device and the at least one likely destination server further comprises sending a dummy message from the computing device to the at least one likely destination server.

8. The method of claim 1, wherein upon determination of a change in the address assignment, the one or more processors are further configured to create a new connection between the computing device and the at least one likely destination server.

9. A system comprising:
at least one likely destination server;
a memory, and
one or more processors coupled to the memory, the one or more processors configured to:
update respective identifiers associated with one or more destination servers based on a change in an address assignment associated with respective ones of the one or more destination servers;
determine at least one likely destination server of the one or more destination servers to which the one or more processors can route content based on the respective identifiers and a pre-determined recipient for the content, the pre-determined recipient being different than the destination server;
determine whether a preexisting connection between a computing device and the at least only likely destination server exists;
determine, based on no preexisting connection, a connection between the computing device and the at least one likely destination server; and
store the connection between the computing device and the at least one likely destination server.

10. The system of claim 9, wherein the one or more processors are further configured to:

receive content for routing to the at least one likely destination server; and
send the received content to the at least one likely destination server.

11. The system of claim 9, wherein the computing device is a source server.

12. The system of claim 9, wherein the at least one likely destination server is based on at least one of: (i) historical data, (ii) geographical proximity information, or (iii) network proximity information.

13. The system of claim 9, wherein the one or more processors are further configured to delete, based on the connection between the computing device and at least one likely destination server, a previous connection between the computing device and at least one unlikely destination server.

14. The system of claim 9, wherein when the one or more processors determine the connection between the computing device and the at least one likely destination server, the one or more processors are further configured to establish the connection between the computing device and the at least one likely destination server.

15. The system of claim 9, wherein when the one or more processors determine the connection between the computing device and the at least one likely destination server, the one or more processors are further configured to send a dummy message from the computing device to the at least one likely destination server.

16. A non-transitory computer-readable medium storing instructions that, when executed by one or more processors, cause the one or more processors to:
update respective identifiers associated with one or more destination servers based on a change in an address assignment associated with respective ones of the one or more destination servers;
determine at least one likely destination server of the one or more destination servers to which the one or more processors can route content based on the respective identifiers and a pre-determined recipient for the content, the pre-determined recipient being different than the destination server;
determine whether a preexisting connection between a computing device and the at least only likely destination server exists;
determine, based on no preexisting connection, a connection between the computing device and the at least one likely destination server; and
store the connection between the computing device and the at least one likely destination server.

17. The non-transitory computer-readable medium of claim 16, further cause the one or more processors to:
receive content for routing to the at least one likely destination server; and
send the received content to the at least one likely destination server.

18. The non-transitory computer-readable medium of claim 16, wherein the computing device is a source server.

19. The non-transitory computer-readable medium of claim 16, wherein the at least one likely destination server is based on at least one of: (i) historical data, (ii) geographical proximity information, or (iii) network proximity information.

20. The non-transitory computer-readable medium of claim 16, further cause the one or more processors to delete, based on the connection between the computing device and at least one likely destination server, a previous connection between the computing device and at least one unlikely destination server.

\* \* \* \* \*